United States Patent
Nadkarni et al.

Patent Number: 5,695,629
Date of Patent: Dec. 9, 1997

[54] FLUIDIZED BED ELECTROWINNING OF COPPER

[75] Inventors: Ravindra M. Nadkarni, Wrentam; David J. Kinneberg, Attleboro, both of Mass.

[73] Assignee: Metalor USA Refining Corp., No. Attleborough, Mass.

[21] Appl. No.: 613,680

[22] Filed: Mar. 11, 1996

[51] Int. Cl.⁶ .................. C25C 1/12; C25C 7/06
[52] U.S. Cl. .............. 205/348; 204/222; 204/257; 204/237
[58] Field of Search ............. 205/348; 204/257, 204/222, 237

[56] References Cited

U.S. PATENT DOCUMENTS

| | | | |
|---|---|---|---|
| 3,956,086 | 5/1976 | Wilkinson et al. | 205/348 |
| 3,974,049 | 8/1976 | James et al. | 205/348 |
| 4,073,707 | 2/1978 | Spaziante et al. | 205/348 X |
| 4,202,752 | 5/1980 | Sherwood et al. | 204/222 |
| 4,240,886 | 12/1980 | Hodges et al. | 205/348 |
| 4,517,064 | 5/1985 | Cook | 204/222 X |

*Primary Examiner*—Donald R. Valentine
*Attorney, Agent, or Firm*—George W. Dishong

[57] ABSTRACT

A fluidized bed electrowinning system and method includes a fluidized bed reaction vessel in which a fluidized bed of conductive particles serves as the cathode for the electrowinning reaction, the anodes being in the form of hollow tubes of electrochemically active material inserted into the fluidized bed and separated therefrom by a membrane. The catholyte and anolyte are separately supplied from an electrolyte supply tank, the catholyte being pumped through the conductive particles to form the fluidized bed and the anolyte being supplied to individual anodes, and are commingled at the top of the reaction vessel before return to the supply tank. Removal of particles from the tank occurs through a part in the side of the tank, the removed particles normally being recycled through a selector valve back into the tank to maintain continuous operation. Periodically, the selector valve is operated to divert particles removed from the reaction vessel to a particle storage tank for subsequent size separation, with smaller particles being returned to the output product. Recycling of the particles during normal operation is facilitated by a recycle pump and eductor located outside the output port, the recycle solution also being commingled with the catholyte and anolyte at the top of the tank before return to the electrolyte supply tank. The electrolyte is refreshed by a separate leaching circuit responsive to monitoring of electrolyte supply in the tank.

19 Claims, 6 Drawing Sheets

FLUIDIZED BED ELECTROWINNING OF COPPER

BACKGROUND OF THE INVENTION

1. Field of the Invention

This invention relates to an electrowinning system and method, and more particularly to an electrowinning system and method that utilizes a fluidized bed as the electrowinning cathode. More particularly the invention relates to the continuous recovery of copper from solution using a fluidized bed without the need to stop the electrowinning operation.

2. Discussion of Related Art.

Fluidized bed electrolysis has long been recognized as having the potential to significantly lower capital requirements and energy consumption in electrowinning and electrorefining operations. Since these operations consume substantial amounts of energy each year, small improvements in energy efficiency can translate into significant energy savings. However, with few exceptions, fluidized bed electrolysis has remained in the laboratory and has not broken the barrier to pilot-scale implementation, let alone to commercial implementation.

By way of background, fluid bed electrolysis makes use of the principle that when a fluid flows upwards through a packed bed of fine particles, the particle mixture in the fluidized bed behaves like a liquid, making material handling easier in comparison with fixed beds. Initially, when the fluid is caused to flow upward through the packed or fixed bed of particles, the fluid percolates through the interstices between particles without imparting any velocity to the particles. As the fluid velocity increases, the pressure drop through the bed also increases, but the particles retain their positions with respect to their neighbors until, at some point, termed the point of incipient fluidization, the velocity of the fluid is such that the frictional force between the particles and the fluid equals the weight of the bed, and any increase in velocities above the minimum fluidization velocity cause the bed to expand in a predictable manner.

At small multiples of the minimum fluidization velocity, the bed expands smoothly to achieve what is referred to in the art as smooth or homogeneous fluidization. Beyond this point, bubbles of liquid free of particles begin to form within the bed and rise upwards to achieve heterogeneous or bubbling fluidization. These bubbles have two consequences: 1) further expansion of the bed does not occur and 2) fluid in the bubbles does not contact particles and so interaction between the two phases decreases. Further increases in flow velocity cause physical entrainment of a substantial portion of the bed and, eventually, particles will be carried out of the bed by the fluid.

There are numerous advantages to fluidized beds:

Excellent mixing of the particles leading to good temperature control and uniformity. This attribute has been used in numerous applications for treating heat-sensitive materials.

Excellent mass transfer between the fluid and the particles. This is the basis of numerous catalytic, combustion or calcination reactions utilizing fluidized bed reactors.

Excellent heat transfer between the fluid and the particles and between the bed itself and the walls of the reactor. There exist many applications that rely on direct heat exchange (between the fluid and the solids) or indirect heat exchange (between the bed and an immersed heat-transfer surface). Examples of this type of application include fluidized bed boilers and coolers.

Because the particle mixture in a fluidized bed behaves like a liquid, as indicated above, material handling is easier in comparison with fixed beds.

Electrowinning is defined as the recovery of previously dissolved metal from leach solutions using insoluble anodes. The cathode reaction for the recovery of copper from sulfate solutions,

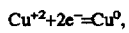

is coupled with the oxidation of water to form oxygen:

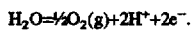

In fluidized bed electrowinning, the bed is made up of conductive particles fluidized by the upward flow of an electrolyte to form at least a first electrode. Depending on cell geometry, the entire bed can behave as an electrode with high surface area, or the bed can be divided into multiple electrodes separated by a porous membrane. Either the cathode or an anode or both can be in the form of fluidized electrodes, or the second electrode can be in the form of a solid electrode inserted into the fluidized bed but in either case a side-by-side configuration of the electrodes is utilized.

The side-by-side configuration for a fluid bed electrode is similar to the traditional electrowinning cell with planar electrodes. The important measure of the intensity of cell operation is current flow per unit area of the separator between the electrodes. This is called the superficial current density. In a fluidized bed electrode, the actual current density (the current density per unit area of particles in the electroactive mass) can be orders of magnitude lower than the superficial current density.

Two strategies for operating a fluidized bed electrode have been developed based on the superficial current density. If the superficial current density is kept at the same level as that used in conventional planar electrodes (of the order of 200 to 300 A/m²), the actual current density is very low and the electrode operates close to equilibrium. This approach is suited for recovering low concentrations of metals from dilute streams, such as waste water. The other mode of operation of a fluidized bed electrode is to maintain actual current densities at the level used in conventional cells. This results in high superficial current densities and high productivity.

Fluidized bed technology in general has been in use for about 70 years. The first application of this technology was the Winkler process, which was commercialized about 1926, and used to gasify low-rank coals in a shallow fluidized bed to produce a synthesis gas—a mixture of hydrogen and carbon monoxide. During World War II, catalytic cracking of petroleum and the regeneration of carbon-coated cracking catalyst was successfully performed in fluidized bed reactors. Since then, most commercial applications have involved gas fluidization; examples include high-temperature roasting of sulfide minerals, reduction of iron ore, calcination of limestone and cement clinker and a wide variety of catalytic, coking and combustion reactions in the petroleum and petrochemical industries. Liquid fluidized beds have been used for a wide array of biochemical reactions and the growth of cell cultures.

The first work in developing fluidized bed electrodes, however, was not begun until the 1960's, at the Universities of Newcastle-Upon-Tyne and Southhampton, in which a process for copper electrowinning was piloted by Constructors John Brown (later CJB Developments Ltd.). This work, which did not result in a commercial operation, was beset by several major problems including excessive voltage (later shown to be due to excessive spacing between the diaphragm and the anode) and adhesion of the particles to the current feeders (thought to be the result of highbed resistance). Since then, a variety of fluidized bed electrowinning systems and methods have been proposed, but none has proven commercially viable. Examples of such proposals systems and methods disclosed in U.S. Pat. Nos. 4,824, 541, 4,240,886, and 4,212,722. Other documents of interest as background include U.S. Pat. Nos. 4,670,116, 4,202,752, 4,073,707, 4,039,402, 3,974,049, and 3,956,086.

SUMMARY OF THE INVENTION

It is accordingly an objective of the invention to provide a system and method for fluidized bed electrowinning that overcomes various practical difficulties which have heretofore prevented large scale implementation of fluidized bed electrowinning technology despite the lower capital and energy costs offered by the technology. The system and method can be applied to the recovery of other metals additional to the recovery of copper. Examples of metals which are recoverable using the system and method disclosed herein are zinc, cadmium, nickel and cobalt.

It is a further objective of the invention to provide a practical system and method for electrowinning using a fluidized bed, and which provides for continuous operation without the need to periodically stop the operation to recover product.

It is yet another objective of the invention to provide a practical system and method for electrowinning copper from copper sulfate using a fluidized bed as one of the electrowinning electrodes.

These objectives are achieved, in accordance with a preferred embodiment of the invention, by providing an electrowinning system and method, and in particular a system and method for electrowinning copper from copper sulfate, which utilizes a fluidized bed reaction vessel containing a distributor or deck plate through which an electrolytic fluid is passed to a bed of conductive particles at a velocity sufficient to form a fluidized bed, the bed forming a cathode which can be operated near equilibrium conditions at substantial current flow to remove a maximum amount of dissolved copper from the solution and in which a plurality of anode assemblies are placed and thereby recover previously dissolved metal from leach solutions according to the following reactions: The cathode reaction for the recovery of copper from sulfate solutions,

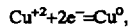

is coupled with the oxidation of water to form oxygen:

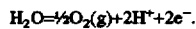

In an especially preferred embodiment of the invention, the distributor or deck plate on which the fluidized bed is formed is a flat plate having a large number of small orifices arranged such that the pressure drop through the deck plate is at least 10% of the total pressure drop in the bed to ensure that there is uniform upward flow across the entire cross-section of the bed and that there are no regions of non-uniform flow. Advantageously, the orifices are countersunk from the top of the deck plate to produce a conical section so as to eliminate a horizontal surface on the plate upon which particles can settle and remain stationary. Large particles that for any reason fall to the bottom of the working volume are forced toward a region of high velocity, throwing the particles back up into the bed.

In the preferred embodiment of the invention, the anodes are preferably a commercially available anode which is made from the appropriate material for providing the above-mentioned oxygen generating reaction. These anodes are encased in a membrane that is impermeable to substantial solution flow but allows the transfer of current. The completed anode assembly is generally in the form of a hollow tube of expanded metal covered completely with the membrane at the portion of the anode inserted into the fluidized bed which solution in the bed functions as the cathode. The end of the anode assembly immersed in solution is sealed so that particles from the bed cannot enter the tube. Cathodic current is supplied to the bed by a plurality of cathode current feeder rods or cathode assemblies. The expanded metal portion is that portion of the anode where the electrochemical action or the oxygen generating action takes place. Electrical potential is uniformly provided to the expanded metal part of the anode using anode current rods connected to the expanded metal part of the anode covering over substantially the length dimension of the anode assembly. Both the anode and cathode assemblies are appropriately attached to electrical bus bars and are suspended in the bed such that each anode assembly is effectively surrounded by many cathodes and vice versa.

Preferably, the particles, which constitute the cathode while in the fluidized bed, are withdrawn from the bed through a port on the side of the reaction vessel near or at the deck plate and transported to the top of the reaction vessel through use of an eductor. As the weight of copper particles increases during electrowinning, the heavier particles fall out of the fluidized volume and accumulate on the deck plate, preventing the free movement of the electrolyte. Normally, particles will be continuously pumped from the bottom of the reaction vessel to the top via the eductor and a selector valve which normally directs the flow back into the reaction vessel, but periodically redirects the flow into a particle storage tank, the particle storage tank providing storage space for particles periodically harvested from the fluidized bed and for all particles during periods when the particles are pumped from the reaction vessel to the particle storage tank. Harvested particles are selected for size by a particle selector and those not selected are sent back to the reaction vessel.

In addition to the recovered particle circuit, the invention provides a cathodic solution circuit and an anodic solution circuit, both the anodic and cathodic solutions, known respectively as the catholyte and anolyte, being pumped from the same electrolyte storage tank, as is the recycle stream used by the eductor to harvest particles from the main reaction vessel. The overflow catholyte and the excess solution from the eductor/classifier is returned to the electrolyte storage tank from which it is pumped to the bottom of the deck plate. Preferably, when the catholyte is returned to the bottom of the fluid bed below the deck plate, the entry of this solution is pointed downwards away from the deck plate to achieve proper dispersion of the flow. Depleted catholyte, which in the preferred system is the anolyte, is supplied to the anode through its own feed tube, with excess anolyte overflowing the membrane and mixing with the catholyte for return to a conventional leaching circuit where the metal content of the catholyte is restored through the leaching of an ore or metallic scrap.

While the invention is disclosed specifically in the context of a copper sulfate/copper electrowinning process, those skilled in the art will appreciate that the principles of the invention could be extended to other electrowinning processes and applications, and that the invention should not be limited to specific materials. In addition, those skilled in the art will appreciate that the invention includes various novel concepts that should be considered both separately, i.e., as being possibly applicable to systems other than the disclosed system, and as a combination, and that the invention may include inventive features not summarized above but which are inherent in the system as described in detail below.

DETAILED DESCRIPTION OF THE PREFERRED EMBODIMENTS

Figure 1:
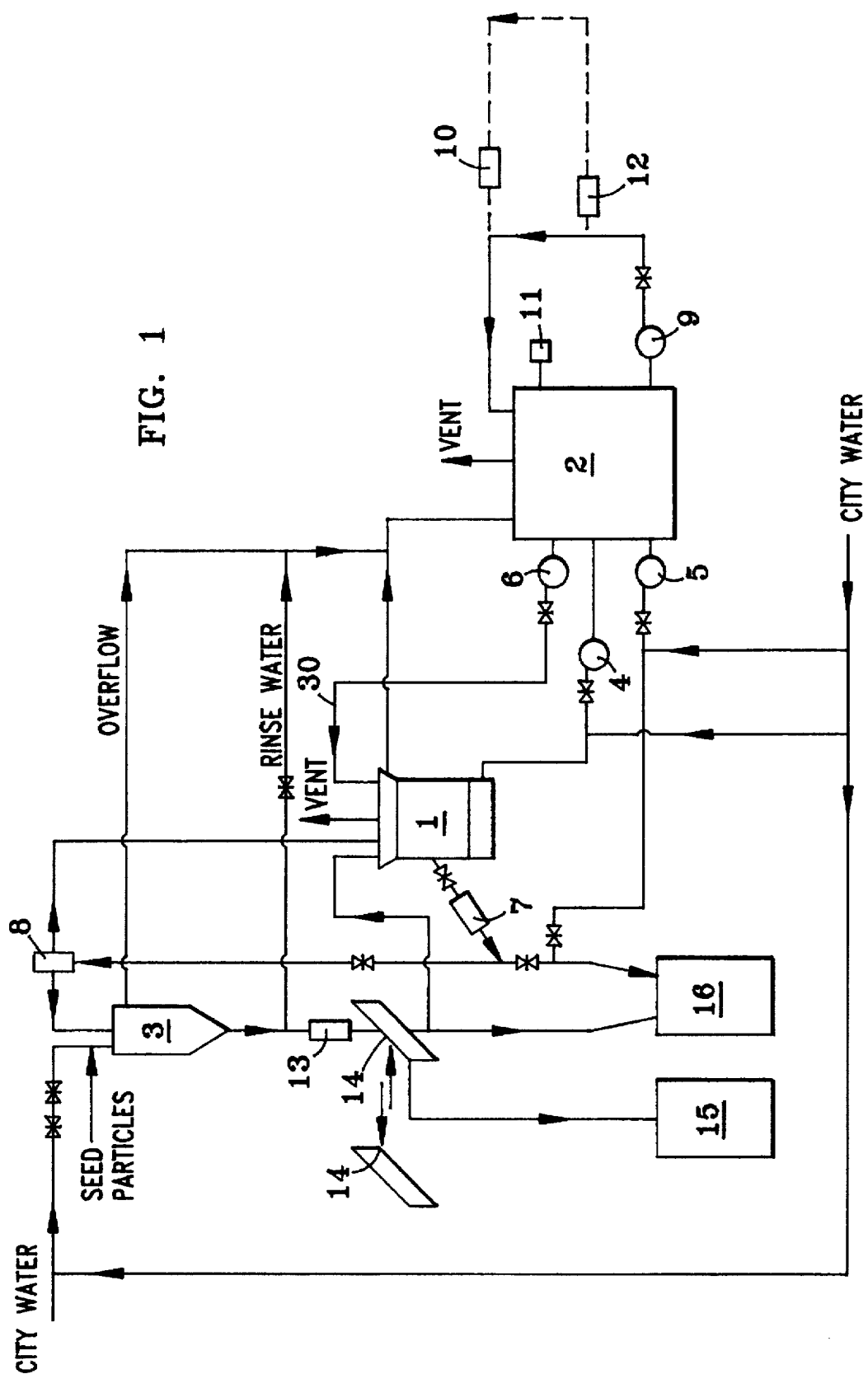
FIG. 1 is a schematic diagram showing an electrowinning system constructed according to the principles of a preferred embodiment of the invention.
Figure 2:
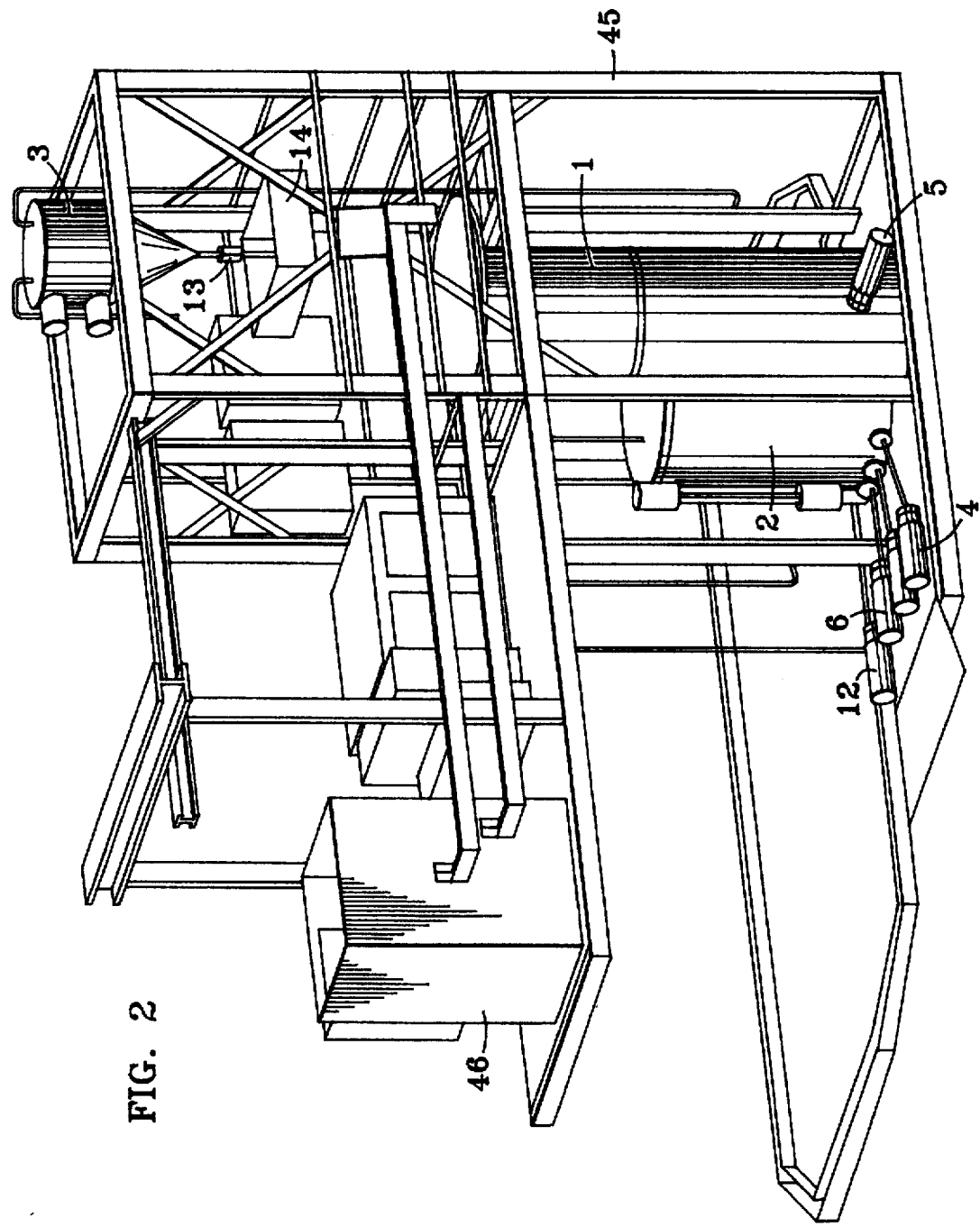
FIG. 2 is a perspective view of an actual implementation of the system schematically illustrated in FIG. 1.

FIG. 1 is a schematic view of a fluidized bed electrowinning system constructed in accordance with the principles of a preferred embodiment of the invention, and FIG. 2 is perspective view illustrating a practical implementation of the system schematically illustrated in FIG. 1. It will be noted by those skilled in the art that the system as illustrated in FIG. 1 includes a number of check valves and computer-activated control valves which are not specifically described herein as their use to maintain and control fluid flow in an indicated direction is a matter of routine design choice, and that the system could include additional piping, valves, and monitors as necessary to obtain the desired fluid flow patterns.

Figure 3:
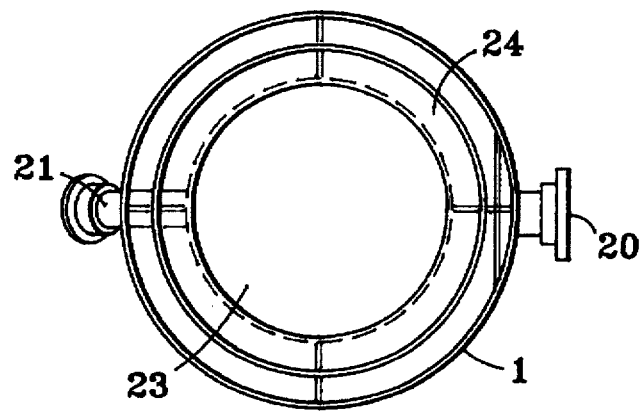
FIG. 3 is a top view of a main reaction vessel for use in the system illustrated in FIG. 1.

The principal elements of the preferred system include a reaction tank or vessel 1, described below and illustrated in greater detail in FIGS. 3–5, a system surge tank 2 for providing solutions to the electrowinning apparatus, and a particle storage tank 3 for providing storage space for particles periodically harvested from the fluidized bed, and for all particles during periods when the fluidized bed is shut down.

The system surge tank 2 provides solution for a fluidization pump 4, recycle pump 5 and anode solution pump 6. All solutions in the illustrated system have the same composition since they originate from the same tank, the surge tank 2. It is also possible to separate analyte and catholyte by having separate flow circuits for each. This feature is not illustrated but it is within the understanding of any ordinarily skilled person practicing in this technology. The fluidization solution or catholyte enters the bottom of the fluidized bed reaction tank or vessel 1 and flows upward, causing particles inside the bed to fluidize. As the solution flows upwards, it is subjected to the cathodic potential applied to the particles, causing copper to be deposited from the solution onto the copper particles. The concentration of copper in the solution is therefore slightly lower leaving the bed than it was upon entering. Catholyte overflows the top of the reaction tank or vessel 1 and returns by gravity to the surge tank 2 tank. Provision is made to prevent as much as possible, interactions between falling electrolyte and atmospheric oxygen.

Figure 6:
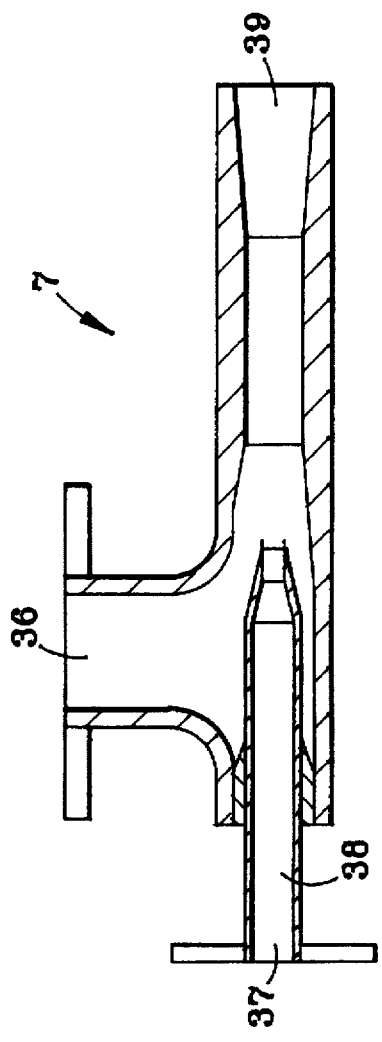
FIG. 6 is a cross-sectional side view of an eductor for use in the preferred system.

The recycle solution is used as a carrier for copper particles which flow out of the bed through an eductor 7, such as the one illustrated in FIG. 6. Solution from surge tank 2 is pumped by recycle pump 5 through the eductor 7 as the motive fluid, creating a negative pressure and drawing particles out of the reaction tank or vessel 1. Particles are transported upwards to a selector valve 8. Depending on the setting of this valve, particles either return to the top of the reaction vessel 1 or are pumped into storage tank 3. The recycle stream is therefore the source of a particle "harvest". Particles can be recovered from the reaction vessel 1 whenever selector valve 8 is set to flow into storage tank 3. This is done periodically with the frequency determined by operating conditions. Those skilled in the art will note that if recycle solution is pumped into the top of the fluidized bed, particles are retained in the bed but the solution, commingling with catholyte, overflows the top of the reaction vessel 1 and returns to surge tank 2. If recycle solution is pumped into tank 3, on the other hand, particles are retained in tank 3 the overflow also going to tank 2.

If needed, an anode solution or anolyte can be pumped from tank 2 by pump 6 and flows to the top of the reaction vessel 1 into a distribution manifold or deck plate 22 (described in detail below) which divides the flow into a plurality of equal streams feeding each of a corresponding number of anodes. In the illustrated embodiment, there is a quantity of 26 of anodes 25. The anode solution can, for example, travel in a flow tube to the bottom of the anode and then flows upwards and overflows out of the anodes and into the catholyte, which in turn overflows the reaction vessel 1 back into surge tank 2.

It will be appreciated that instead of commingling the anolyte and catholyte at the top of the reaction vessel, and returning the commingled fluid to the surge tank 2, a manifold system could also be designed to keep the anolyte separate from the catholyte. This would require a separate anolyte tank but would have two advantages: 1) oxidation products from the anode, especially oxygen, would be kept away from particles in the reaction vessel 1, preventing redissolution of copper and the lowering of the overall current efficiency; and 2) anode reactions other than the oxidation of water, such as the ferric/ferrous couple or sulfate/sulfite couple could be utilized. These alternative reactions could serve as a means of lowering overall cell voltage and increasing energy efficiency by eliminating the over potential associated with bubble formation.

To prevent the copper concentration in surge tank 2 from continuously falling, as would be the case if there were no external source of copper sulfate solution, a sulfate leaching system is connected to tank 2 through a pump 9 and its associated piping. Solution from the leach circuit continuously flows into tank 2 through a valve 10 to cause the level in the surge tank to rise. At a predetermined point, measured by level detecting instrument 11, the main computer control program for the system closes valve 10 and opens valve 12. Solution then flows out of the surge tank 2 back to the leach circuit. This continues until the level drops to a predetermined point, as a result of which the level in surge tank 2 is maintained between two control points. The concentration of copper in the surge tank 2 is determined by the relative rates at which copper is deposited on cathodic copper particles and the rate at which copper is brought into tank 2 from the leach circuit. The flow rate from the leach circuit is adjusted periodically depending on analytical determinations of the copper concentration in surge tank 2. If the copper concentration falls with time, the operator increases the flow of solution from the leach circuit. If the copper concentration increases, the operator decreases the flow of solution.

As indicated above, particle storage tank 3 provides storage space for particles periodically harvested from the fluidized bed reaction vessel 1 and for all particles during periods when the fluidized bed is shut down. For shut down periods, particles are pumped from the reaction vessel 1 to tank 3 for storage. Once the bed is restarted, valve 13 is opened and particles are directed back into the reaction vessel 1. During routine operation, particles are continuously pumped from the bottom of the reaction vessel 1 to the top via the eductor 7 and selector valve 8, which periodically redirects the flow into storage tank 3, at which point particles settle into the storage tank 3 while solution overflows the storage tank 3 back into the surge tank 2. At the end of a production period, for example a shift, 24-hour day, or the like, the particles in the storage tank 3 are rinsed with fresh water, which also overflows into the surge tank 2, and are screened or separated according to size. Large particles are retained on the screen or size selection device 14 and set aside in drums 15 and 16 as product. Small particles pass through device 14 and are returned to the reaction vessel 1.

Sometimes, the fluidized bed might lose fluidization because of power failure and/or stoppage of pump 4. In this case, the fluid and the small particles would sift through the holes in the deck plate. This sifting is prevented with a backflow preventer 40 positioned as indicated in FIG. 4.

Because the particles in the preferred system grow continuously from a small size to a large size, and thus at some point will be exactly the same size as the apertures in the particle size selection device 14, resulting in blinding or clogging, the separation device must be operated on an intermittent basis. For true continuous operation, a centrifugal size separator would be best, because these units separate large particles from small particles based on relative settling rates and there are no small apertures to clog, but in the currently preferred system, as described above, particles are removed from the reaction vessel 1 on an intermittent basis by periodically operating selector valve 8, with particles of all sizes being stored in tank 3 to be rinsed, at some predetermined point, and separated with large particles being collected in drums and small particles being returned to the reaction vessel 1.

Figure 4:
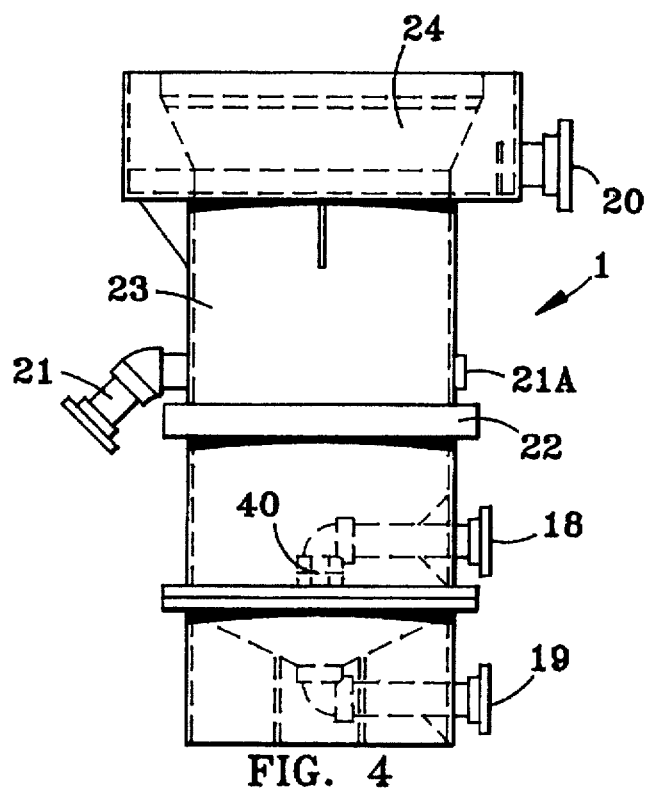
FIG. 4 is a side view of the vessel illustrated in FIG. 3.
Figure 5:
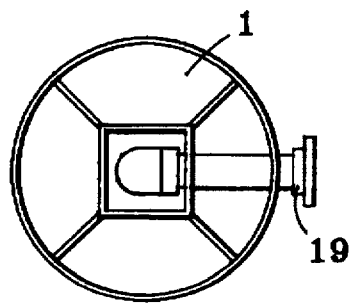
FIG. 5 is a bottom view of the vessel illustrated in FIG. 3.

The reaction vessel 1 that forms the fluidized bed, as illustrated in FIG. 4, is cylindrical, but it can also be square or rectangular in cross section. The catholyte enters the vessel 1 through an inlet pipe 18 which is preferably pointed downward towards a frustoconical or funnel-shaped surface to achieve proper dispersion of the flow. Vessel 1 also includes a drain outlet 19, an overflow outlet 20 connected to the surge tank 2 for removing the combined electrolyte from the top of the reaction vessel 1, as discussed above and an emergency discharge outlet 21A for quickly emptying the fluidized bed. Finally, the reaction vessel 1 also includes an outlet 21 connected to eductor 7 through which the particles in the reaction vessel 1 are periodically harvested and which is located at or near the deck or distributor plate 22 above which the fluidized bed is formed.

Figure 13A:
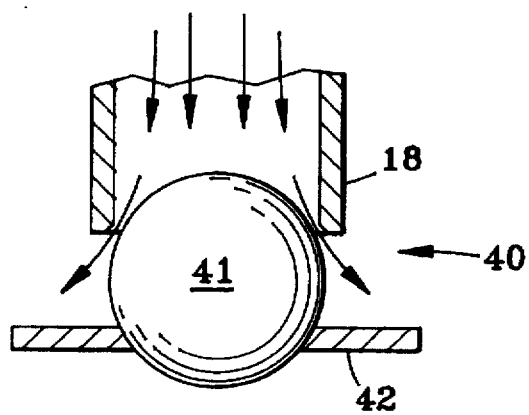
FIG. 13A is a schematic representation of a back flow preventer for use with the preferred system shown in the open position.
Figure 13B:
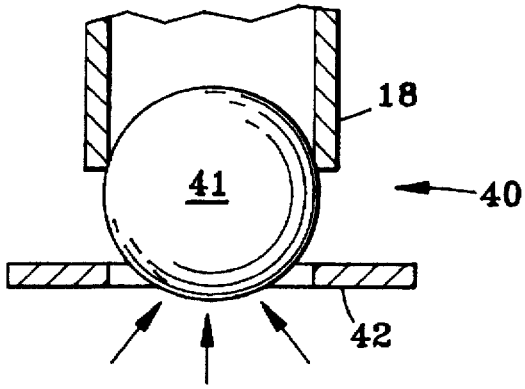
FIG. 13B is a schematic representation of a back flow preventer for use with the preferred system shown in the closed position.

Backflow preventer 40 is designed to prevent the flow of particles into the inlet during periods when the bed is not fluidized. The backflow preventer 40, shown in basically schematic form in FIG. 13A, in the open position consists of a ball 41 of material having specific gravity less than the electrolyte, positioned in the center of a deflector plate 42. When electrolyte is entering the fluidized bed, the ball is forced downward. The surface of the ball allows a smooth transition from the vertically downwards motion to a horizontal motion. When the bed is not fluidized (shown in FIG. 13B), the ball is forced upwards by buoyant forces into the inlet opening, sealing the inlet from further flow.

Whether circular or rectangular in cross section, the vessel 1 has straight, vertical sides for the active section 23 of the bed. The section 24 above the top level of the fluidized particles has a flared or larger cross-section. This larger cross-section causes the superficial fluid velocity to decrease, enabling the particles to disengage from the catholyte. This results in a relatively sharp interface between the fluidized bed of particles and the upper layer of depleted catholyte, enabling better control of the operation.

The distribution manifold of the reaction vessel 1 is a distributor or deck plate 22 which forms the lower boundary of the bed and is preferably in the form of a flat plate having a large number of small orifices 43 23 arranged such that the pressure drop through the deck plate 22 is at least 10% of the total pressure drop in the bed to ensure that there is uniform upward flow across the entire cross-section of the bed and that there are no regions of non-uniform flow. Those skilled in the art will appreciate that the size and number of orifices 43 is important to the operation of the reaction vessel 1. With too many orifices or too large a hole diameter an uneven flow of solution through the deck plate 22 results and too few orifices results in dead areas on the plate 22. Standard design procedures are available in the literature and known to those skilled in the art to allow these important parameters to be estimated.

Figure 12:
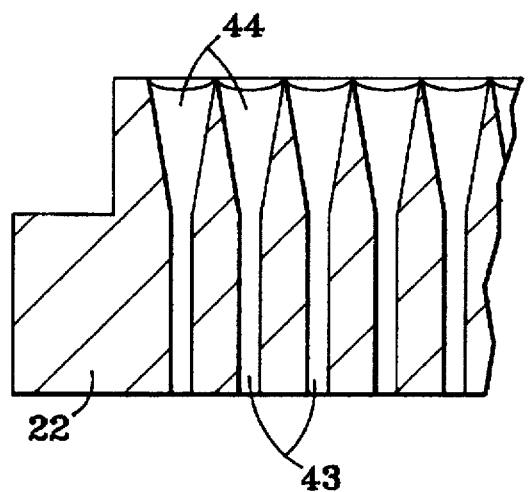
FIG. 12 is a cross-sectional view of a deck plate for use in the preferred system.

In the deck or distributor plate 22 of the preferred system, the orifices 43 23 are countersunk from the top to produce a conical section 24 so as to eliminate horizontal surfaces on the plate upon which particles could settle and remain stationary, a s illustrated in FIG. 12. Large particles that for any reason fall to the bottom of the working volume are forced toward a region of high velocity where they are thrown back up into the bed. The thickness of the plate 22 must thus be determined by the selected cone angle and the spacing between the orifices 43.

The fluidized bed thus formed is operated under conditions that achieve either particulate fluidization or bubbling fluidization. Which behavior is achieved is determined through the suitable selection of particle size, the particle size distribution (which increases as the operation progresses), and of course fluidization velocity. Preferably, the fluidization velocity is such that the bed expansion is under 25% and preferably below 20%, with the upper level of the cathode bed being measured by level sensors (not shown) based on optical clarity or conductivity. In the illustrated embodiment, fresh particles of the smallest size are added through the top of the reaction vessel 1 if the level drops below a desired set point, but the particles could also be added through a feeder line and/or mixed with solution if convenient. The seed particles, which are of a predetermined size, are commercially available.

The discharge pressure of the fluidization pump 4 is determined by the pipe arrangement between the pump 4 and the reaction vessel 1, the size and number of holes or orifices 23 in the distributor or deck plate 22, whether any of the orifices 43 are plugged, the amount of seed particles added to the vessel, and the flow rate of catholyte through the pump 4. Those skilled in the art will note that a design consideration for the plate 22 is to limit the required pressure since higher pumping pressures mean higher pumping costs.

Figure 7:
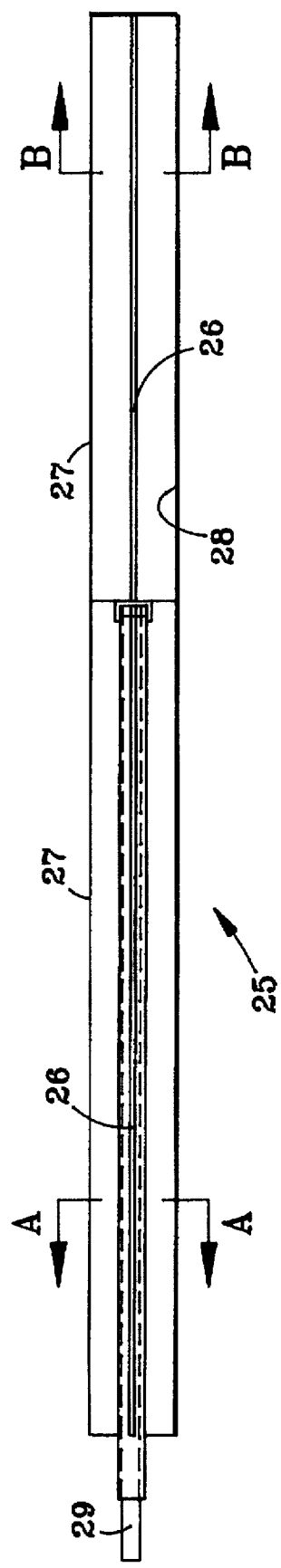
FIG. 7 is a side view of an anode structure for use in the preferred system.
Figure 9:
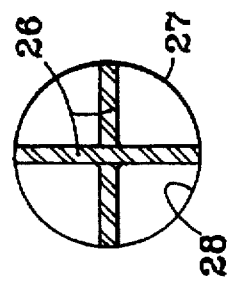
FIG. 9 is a cross-sectional end view taken along line B—B in FIG. 7.
Figure 8:
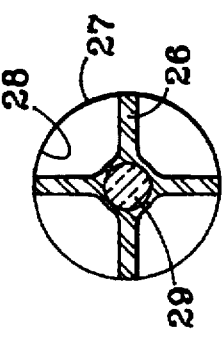
FIG. 8 is a cross-sectional end view taken along line A—A in FIG. 7.

As illustrated in FIGS. 7-9, the anode assemblies inserted into the fluidized bed are in the form of an anode current feeder element 29 electrically and mechanically connected to rods 26 which rods 26 are surrounded by the expanded metal electrochemically active area or the oxygen generating area 28 which is typically in mesh and rolled form and covered by a membrane 27. Anode current feeder element 29 is connected to a current supply. A number of commercially available materials can be used in the anodes to provide the desired oxygen generating reactions, including expanded titanium coated with precious metals as well as foamed graphites. The membrane in which the anodes are encased must be impermeable to substantial solution flow but must allow transfer of current. Suitable microporous membranes include DARAMIC™, while ion-selective membranes such as NAFION™ may also be used. The completed anode assembly is a hollow tube of the expanded metal covered completely with oxygen generating area 28 and with the membrane for the wetted portion of the anode, with the anolyte in the form of depleted catholyte being supplied through separate feed tubes (represented by the single schematically illustrated pipe 30 in FIG. 1), and excess anolyte overflowing over the membrane and mixing with the catholyte at the top of reaction vessel 1. For a titanium anode, current feeder 29 can be in the form of a titanium clad copper rod to which the titanium sections are welded.

Figure 10:
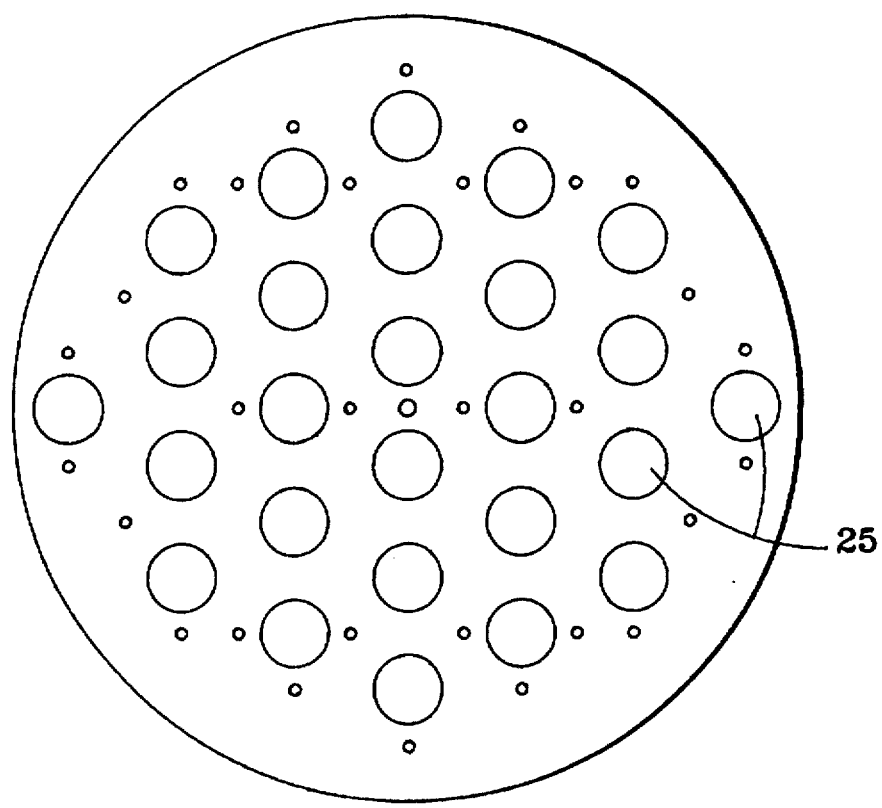
FIG. 10 is a top view of the fluidized bed tank showing the arrangement of anodes in the preferred system.
Figure 11:
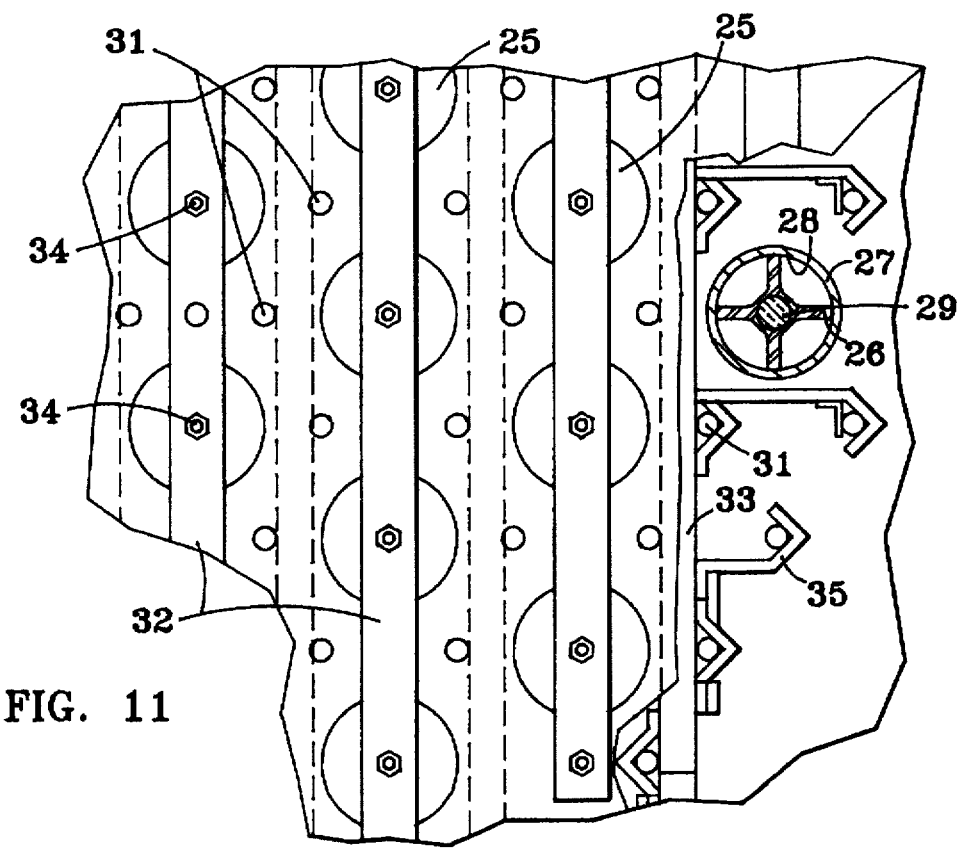
FIG. 11 is a more detailed view showing the arrangement of anode and cathode bus bars for use in the preferred system.

As illustrated in FIGS. 10 and 11, anode and cathode current feeder elements 29 and 31 are attached to respective bus bars 32 and 33 and are suspended by appropriate fastening elements 34 and brackets 35 in the bed such that each anode assembly 25 is surrounded by many cathode feeder elements 31 and vice versa. While the arrangement can be varied geometrically as desired, it is important to note that the anode cathode distance not exceed a distance which will cause parts of the cathode to become electrically anodic and cause the particles to dissolve and reverse the electrowinning reaction.

As illustrated in FIG. 6, eductor 7 used in the preferred system is a commercially available device which is used to generate a low pressure at the bottom of the fluidized bed so that particles Can flow from the bed into the recycle stream. The illustrated eductor includes a suction connection 36, a motive connection 37 having an axially adjustable nozzle 38, and a discharge port 39, with the performance of the eductor being determined by the relative size of the three openings and the flow rate of the motive fluid. It will of course be appreciated that the illustrated eductor is an example only, and that the invention is not to limited to any particular type of device for controlling the flow rate and pressure of particles being extracted from reaction vessel 1 for transport to selector valve 8.

Finally, it will be noted by those skilled in the art that the implementation illustrated in FIG. 2 is merely a test set-up, for a 10,000 amp system, and that illustrated supporting frame 45, power supply transformer 46, and the like could take numerous different forms upon adaptation for larger scale electrowinning operations. In addition, as explained above, while the preferred system is described as being for the electrowinning of copper from copper sulfate, the system could be adapted for processing of a variety of different materials.

Because the preferred embodiment of the invention described and illustrated in the drawings is clearly subject to a variety of variations and modifications without departing from the basic concepts of the invention, those skilled in the art will appreciate that the invention should not be limited by the above description or accompanying drawings. Instead, it is intended that the invention be defined solely in accordance with the appended claims.

We claim:

1. A fluidized bed electrowinning system which provides for continuous operation without the need to periodically stop the operation to recover product, comprising:

A fluidized bed reaction vessel in which is mounted a distribution manifold including orifices which form a means through which catholyte is passed to a bed of conductive particles at a velocity sufficient to form a fluidized bed, the fluidized bed thus formed serving as a large area cathode;

a plurality of insoluble conductive anode assemblies positioned in the fluidized bed to form anodes that provide a means for recovering previously dissolved metal from electrolytic fluid by causing precipitation of the dissolved metal onto said conductive particles, said anodes being separated from the cathode by a membrane which surrounds metallic rods of said anode assemblies and permits transfer of current while being impermeable to substantial fluid flow;

a plurality of cathode current feeders and a plurality of anode current feeders that form a means for supplying electrical current to said fluidized bed and said anode assemblies;

a catholyte supply and recovery circuit including means for supplying the catholyte from an electrolyte storage tank to an input port positioned below said distribution manifold in said reaction vessel, and for recovering catholyte overflowing at a top of the reaction vessel;

an anolyte supply circuit including means for supplying an anolyte to said anode assemblies;

a port in a side of the reaction vessel located near the distribution manifold and forming a means for removing particles of all sizes from the reaction vessel;

a selector valve which forms a means for recycling removed particles back into the reaction vessel and for periodically feeding removed particles to a particle storage tank; and a particle size separation device which forms a means for separating particles stored in the particle storage tank according to size, returning smaller particles to the reaction vessel and supplying larger particles as a product output of the system, said system thereby continuously operable without the need to stop operation of said system to recover said product output.

2. The system as claimed in claim 1, wherein said means for removing particles from the reaction vessel further comprises means for continuously pumping particles from said port during routine operation, wherein said selector valve normally recycles said particles to said reaction vessel to maintain continuous operation of the system without the need for continuous monitoring of particle size, which recycling is interrupted only periodically by operating said selector valve to divert particles to said particle storage tank for subsequent size selection.

3. The system as claimed in claim 2, wherein said means for removing particles from said reaction vessel comprises an eductor situated outside said port, and a recycle pump which forms a means for pumping fluid from said electrolyte storage tank through said eductor to provide sufficient fluid pressure to transport said fluid to the selector valve.

4. The system as claimed in claim 1, wherein said distribution manifold comprises a substantially flat distribution plate containing said orifices and arranged to ensure that there is a uniform upward flow across an entire cross-section of the fluidized bed.

5. The system as claimed in claim 4, further comprising means for preventing back flow or particles mounted within said input port, said means for preventing back flow being in an open condition when said system is in operation and in a closed condition when said system is not operating and wherein said orifices are countersunk from a top of said distribution plate to produce a conical section so as to eliminate a horizontal surface on the plate upon which particles can settle and remain stationary.

6. The system as claimed in claim 1, wherein a section of the reaction vessel is adapted to be above the fluidized bed, said section being flared to cause a superficial velocity of the fluidized bed to decrease and enable particles to disengage from the catholyte, whereby a relatively sharp interface between the fluidized bed and an upper layer of depleted catholyte is formed.

7. The system as claimed in claim 1, wherein said catholyte and said anolyte both constitute electrolytic fluid from said electrolyte storage tank, and further comprising means to commingle said catholyte and said anolyte at a top of the reaction vessel before return to the electrolyte storage tank.

8. The system as claimed in claim 7, further comprising separate pipes and pumps to provide supply said catholyte and anolyte to the reaction vessel from the electrolyte storage tank.

9. The system as claimed in claim 7, further comprising means to provide a recycle solution supplied by the electrolyte supply tank, said recycle solution carrying said particles removed through the partical removal port in the reaction vessel and recycled through the selector valve, said recycle solution also commingling with the catholyte at the top of the reaction vessel before return to the electrolyte supply tank.

10. The system as claimed in claim 1, wherein said conductive particles are copper, said electrolytic solution includes copper sulfate, and said product output includes copper electrowon from said copper sulfate wherein a cathodic reaction for the recovery of copper from the copper sulfate solution is $$Cu^{+2}+2e^-=Cu^0,$$

and coupled anodic reaction is $$H_2O=\tfrac{1}{2}O_2(g)+2H^++2e^-.$$

11. The system as claimed in claim 10, further comprising a sulfate leaching system connoted to the electrolyte supply tank, and means for pumping depleted electrolyte solution into the leaching system when a level of electrolyte solution in said electrolyte supply tank rises above a point, and for pumping refreshed electrolyte solution back into the electrolyte supply tank when the level of electrolyte solution in said electrolyte supply tank falls below a point.

12. A fluidized bed electrowinning method which method provides for continuous operation without the need to periodically stop the operation to recover product, said method comprising the steps of:

supplying catholyte from an electrolyte storage tank to a reaction vessel and passing the catholyte through a distribution manifold and a bed of conductive particles in the reaction vessel at a velocity sufficient to form a fluidized bed of said conductive particles, the fluidized bed thus formed serving as a large area cathode;

supplying electric current to said catholyte and to a plurality of cathode current feeders in the form of insoluble conductive metallic rods positioned in the fluidized bed and to a plurality of anodes supplied with an anolyte to thereby recover previously dissolved metal from the electrolytic fluid by causing precipitation of the dissolved metal onto said conductive particles, said anodes being separated from the cathode by a membrane which surrounds the metallic rods and permits transfer of current while being impermeable to substantial fluid flow;

recovering catholyte overflowing at a top of the reaction vessel and returning it to the electrolyte storage tank;

removing particles of all sizes from said bed through a port in a side of the reaction vessel located near the distribution manifold;

operating a selector valve to recycle particles removed from the bed back into the reaction vessel and to periodically feed the removed particles to a particle storage tank; and separating particles stored in the particle storage tank according to size, returning smaller particles to the reaction vessel and supplying larger particles as a product output of the method, said method thereby providing for continuous operation of the fluidized bed thus formed without the need to stop operation to recover said product output.

13. A method as claimed in claim 12, wherein the steps of removing particles from the reaction vessel and operating said selector valve further comprise the steps of continuously pumping particles from said port during routine operation; normally operating said selector valve to recycle said particles back into said reaction vessel to maintain continuous operation of the reaction vessel without the need for continuous monitoring of particle size; and periodically operating said selector valve to divert particles to said particle storage tank for subsequent size selection.

14. A method as claimed in claim 13, wherein the step of removing particles from said reaction vessel comprises the step of operating a recycle pump to pump fluid from said electrolyte storage tank through an eductor to provide sufficient fluid pressure to transport said fluid to the selector valve.

15. A method as claimed in claim 12, wherein said catholyte and said anolyte both constitute electrolytic fluid from said electrolyte storage tank, and wherein said catholyte and said anolyte commingle at a top of the reaction vessel before return to the electrolyte storage tank.

16. A method as claimed in claim 15, wherein said catholyte and anolyte are supplied to the reaction vessel from the electrolyte storage tank by separate pipes and pumps.

17. A method as claimed in claim 15, wherein said particles removed through the particle removal port in the reaction vessel and recycled through the selector valve are carried by a recycle solution supplied by the electrolyte supply tank, said recycle solution also commingling with the catholyte at the top of the reaction vessel before return to the electrolyte supply tank.

18. A method as claimed in claim 12, wherein said particles are copper and said electrolyte solution is copper sulfate.

19. A method as claimed in claim 18, further comprising the steps of pumping depleted electrolyte solution into a leaching system when a level of electrolyte solution in said electrolyte supply tank rises above a point, and pumping refreshed electrolyte solution back into the electrolyte supply tank when the level of electrolyte solution in said electrolyte supply tank falls below a point.

* * * * *